(12) United States Patent
Hite et al.

(10) Patent No.: US 7,812,551 B2
(45) Date of Patent: Oct. 12, 2010

(54) LIGHTING CONTROL METHOD HAVING A LIGHT OUTPUT RAMPING FUNCTION

(75) Inventors: David A. Hite, Wetumpka, AL (US); Sheari A. Rice, Richmond Heights, OH (US)

(73) Assignee: American Sterilizer Company, Mentor, OH (US)

( * ) Notice: Subject to any disclaimer, the term of this patent is extended or adjusted under 35 U.S.C. 154(b) by 86 days.

(21) Appl. No.: 12/410,494

(22) Filed: Mar. 25, 2009

(65) Prior Publication Data

US 2009/0179595 A1    Jul. 16, 2009

Related U.S. Application Data

(63) Continuation-in-part of application No. 11/875,083, filed on Oct. 19, 2007, now Pat. No. 7,701,151.

(51) Int. Cl.
G05F 1/00 (2006.01)
(52) U.S. Cl. .................. 315/291; 315/224; 315/247; 315/209 R; 315/312
(58) Field of Classification Search ............. 315/247, 315/246, 224, 225, 209 R, 185 S, 291, 297, 315/307–326; 345/82, 102, 101, 211–214
See application file for complete search history.

(56) References Cited

U.S. PATENT DOCUMENTS

| | | | |
|---|---|---|---|
| 4,962,687 A | 10/1990 | Belliveau et al. | 84/464 |
| 5,073,838 A | 12/1991 | Ames | 361/103 |
| 5,078,039 A | 1/1992 | Tulk et al. | 84/464 |
| 5,325,383 A | 6/1994 | Davis et al. | 372/26 |
| 6,016,038 A | 1/2000 | Mueller et al. | 315/291 |
| 6,095,661 A | 8/2000 | Lebens et al. | 362/184 |
| 6,150,774 A | 11/2000 | Mueller et al. | 315/291 |
| 6,222,172 B1 | 4/2001 | Fossum et al. | 250/205 |
| 6,329,764 B1 | 12/2001 | van de Ven | 315/291 |
| 6,340,868 B1 | 1/2002 | Lys et al. | 315/185 |
| 6,351,079 B1 | 2/2002 | Willis | 315/200 |
| 6,362,578 B1 | 3/2002 | Swanson et al. | 315/307 |
| 6,381,551 B1 | 4/2002 | Raiser | 702/107 |

(Continued)

FOREIGN PATENT DOCUMENTS

JP    58-182562    10/1983

(Continued)

OTHER PUBLICATIONS

Bozkurt et al., "Safety Assessment of Near Infrared Light Emitting Diodes for Diffuse Optical Measurements," *BioMedical Engineering Online*, PMC406415, Mar. 22, 2004, see Methods section, http://www.pubmedcentral.nih.gov/picrender.fcgi?artid=406415&blobtype=pdf.

(Continued)

*Primary Examiner*—Tuyet Thi Vo
(74) *Attorney, Agent, or Firm*—Kusner & Jaffe; Michael A. Centanni

(57) ABSTRACT

A lighting control method for maintaining substantially uniform light output from an LED light source during a warm-up period. A ramp duty cycle function gradually increases the duty cycle of an LED drive output signal during the warm-up period of the LED light source.

7 Claims, 5 Drawing Sheets

U.S. PATENT DOCUMENTS

| | | | |
|---|---|---|---|
| 6,392,358 B1 | 5/2002 | Runau et al. | 315/185 |
| 6,414,860 B1 | 7/2002 | Li | 363/49 |
| 6,510,995 B2 | 1/2003 | Muthu et al. | 235/454 |
| 6,548,967 B1 | 4/2003 | Dowling et al. | 315/318 |
| 6,608,452 B1 | 8/2003 | Holmes | 315/307 |
| 6,621,613 B2 | 9/2003 | Silberberg et al. | 359/239 |
| 6,717,373 B2 | 4/2004 | Cash | 315/291 |
| 6,806,659 B1 | 10/2004 | Mueller et al. | 315/295 |
| 6,808,287 B2 | 10/2004 | Lebens et al. | 362/184 |
| 6,836,081 B2 | 12/2004 | Swanson et al. | 315/307 |
| 6,841,947 B2 | 1/2005 | Berg-johansen | 315/169.3 |
| 6,870,325 B2 | 3/2005 | Bushell et al. | 315/224 |
| 6,930,452 B2 | 8/2005 | De Krijger et al. | 315/192 |
| 6,963,175 B2 | 11/2005 | Archenhold et al. | 315/291 |
| 6,967,448 B2 | 11/2005 | Morgan et al. | 315/295 |
| 6,987,787 B1 | 1/2006 | Mick | 372/29.021 |
| 6,989,520 B2 | 1/2006 | Mochiduki et al. | 250/205 |
| 7,014,336 B1 | 3/2006 | Ducharme et al. | 362/231 |
| 7,015,825 B2 | 3/2006 | Callahan | 340/815.45 |
| 7,023,147 B2 | 4/2006 | Colby et al. | 315/291 |
| 7,045,974 B2 | 5/2006 | Lin et al. | 315/308 |
| 7,049,758 B2 | 5/2006 | Weyhrauch et al. | 315/209 |
| 7,053,562 B2 | 5/2006 | Weyhrauch et al. | 315/209 |
| 7,067,995 B2 | 6/2006 | Gunter et al. | 315/312 |
| 7,088,059 B2 | 8/2006 | McKinney et al. | 315/291 |
| 7,106,036 B1 | 9/2006 | Collins | 323/382 |
| 7,116,062 B2 | 10/2006 | Weyhrauch et al. | 315/209 |
| 7,145,295 B1 | 12/2006 | Lee et al. | 315/291 |
| 7,196,481 B2 | 3/2007 | Bushell et al. | 315/291 |
| 7,321,385 B2 | 1/2008 | Rus et al. | 348/69 |
| 2002/0190666 A1 | 12/2002 | Sakamoto et al. | 315/291 |
| 2005/0099824 A1 | 5/2005 | Dowling et al. | 362/572 |
| 2006/0202914 A1 | 9/2006 | Ashdown | 345/46 |
| 2006/0273741 A1 | 12/2006 | Stalker, III | 315/291 |
| 2008/0001061 A1 | 1/2008 | Glassner et al. | 250/206 |
| 2008/0116827 A1 | 5/2008 | Williams | 315/360 |

FOREIGN PATENT DOCUMENTS

| | | |
|---|---|---|
| JP | 11-298044 | 10/1999 |
| WO | WO 2008/103032 | 8/2008 |

OTHER PUBLICATIONS

Brukilacchio et al., "Beyond the Limitations of Today's LED Packages: Optimizing Brightness LED Performance by a Comprehensive Systems Design Approach," Mar. 11, 2006 (site last updated Oct. 15, 2006 (from Internet Archive Wayback Machine)), http://www.innovationsinoptics.com/technology/IOI_Technology_Overview.pdf.

"High Efficiency 10 LED Boost Converter," Catalyst Semiconductor, Inc., Revision C, Issued Oct. 17, 2007, http://www.zlgmcu.com/catalyst/LED/CAT4238.pdf.

LIGHTING CONTROL METHOD HAVING A LIGHT OUTPUT RAMPING FUNCTION

RELATED APPLICATIONS

This application is a Continuation-in-Part (CIP) of U.S. application Ser. No. 11/875,083, filed Oct. 19, 2007 now U.S. Pat. No. 7,701,151, and is hereby fully incorporated by reference.

FIELD OF THE INVENTION

The present invention relates generally to lighting control, and more particularly to a lighting control method having a light output ramping function to provide substantially uniform light output during a warm-up period.

BACKGROUND OF THE INVENTION

Many drawbacks have been identified in existing lighting control systems that can result in less than desired performance of a lighting device. These drawbacks include, but are not limited to, voltage variations among LED lighting modules that result in non-uniform light output. These voltage variations may result from the lack of uniformity in the manufacture of the LEDs used in a lighting device.

Another drawback of existing lighting control systems is the inability of the lighting circuitry to compensate for the effects of temperature changes on the LED forward voltages, such as changes required in the drive voltage caused by an increase in temperature. In this regard, existing lighting control systems do not compensate for inherent forward voltage changes as seen by an output driver over the entire operating temperature range of the lighting device.

Furthermore, as well known to those skilled in the art, the light output of an LED is inversely proportional to the junction temperature of the LED. Therefore, when the LED is first activated (i.e., cold startup), the junction temperature is low and the light output is high. As the junction temperature increases during a warm-up period (typically lasting about 30 minutes), the light output of the LED will decrease until the LED reaches a steady state condition. Once the steady state condition has been reached, the LED junction operating temperature will remain generally constant, and consequently the light output will remain generally constant during that continuous period of use.

The decay in the LED light output during the warm-up period may be as large as 20%. Therefore, the LED light output during the warm-up period is not generally uniform, and the LED light output at steady state may be significantly lower than the expected nominal light output at steady state. It is also possible that the LED light output at cold startup may exceed an upper limit light output.

The foregoing drawbacks are particularly disadvantageous where the lighting device is a surgical lighthead that requires substantially constant light output or lux readings.

The present invention addresses these and other drawbacks to provide an improved lighting control method for a lighting device.

SUMMARY OF THE INVENTION

In accordance with the present invention, there is provided a lighting control method for controlling an LED light source during an LED warm-up mode. The method comprises: (a) retrieving a pre-stored setpoint duty cycle corresponding to a light intensity level; (b) operating the LED light source during a first time interval at an operating duty cycle equal to the setpoint duty cycle minus a pre-stored duty cycle trim value; (c) setting a duty cycle ramp value equal to a pre-stored duty cycle step value; (d) operating the LED light source for a time interval at an operating duty cycle equal to the setpoint duty cycle minus the duty cycle trim value plus the duty cycle ramp value; and determining whether (1) a ramp-up time has elapsed, (2) the operating duty cycle equals the setpoint duty cycle, or (3) a new light intensity level has been selected. The LED warm-up mode is ended if any one of (1), (2) or (3) has occurred. If (1), (2) and (3) have not occurred, then the duty cycle ramp value is increased by the duty cycle step value, and the method returns to step (d).

In accordance with another aspect of the present invention, there is provided a lighting control method for controlling an LED light source during an LED warm-up mode, the method comprising: (a) establishing a light intensity level; (b) retrieving a pre-stored setpoint duty cycle corresponding to the light intensity level; (c) retrieving a pre-stored duty cycle trim value; (d) operating the LED light source during a first time interval at an operating duty cycle equal to the setpoint duty cycle minus the duty cycle trim value; (e) retrieving a pre-stored ramp-up time; (f) retrieving a pre-stored duty cycle step value; (g) setting a duty cycle ramp value equal to the pre-stored duty cycle step value; (h) operating the LED light source for a time interval at an operating duty cycle equal to the setpoint duty cycle minus the duty cycle trim value plus the duty cycle ramp value, (i) determining whether a predetermined condition has been satisfied; (j) if the predetermined condition has been satisfied, then increasing the duty cycle ramp value by the duty cycle step value and returning to step (h); and (k) if the predetermined condition has not been satisfied, then ending the warm-up-mode.

An advantage of the present invention is the provision of a lighting control method that provides improved uniformity in the light output from an LED light source during an LED warm-up period.

Another advantage of the present invention is the provision of a lighting control method that prevents light output of an LED light source from exceeding an upper limit light output value.

These and other advantages will become apparent from the following description taken together with the accompanying drawings and the appended claims.

BRIEF DESCRIPTION OF THE DRAWINGS

The invention may take physical form in certain parts and arrangement of parts, an embodiment of which will be described in detail in the specification and illustrated in the accompanying drawings which form a part hereof, and wherein.

DETAILED DESCRIPTION OF THE INVENTION

Figure 1:
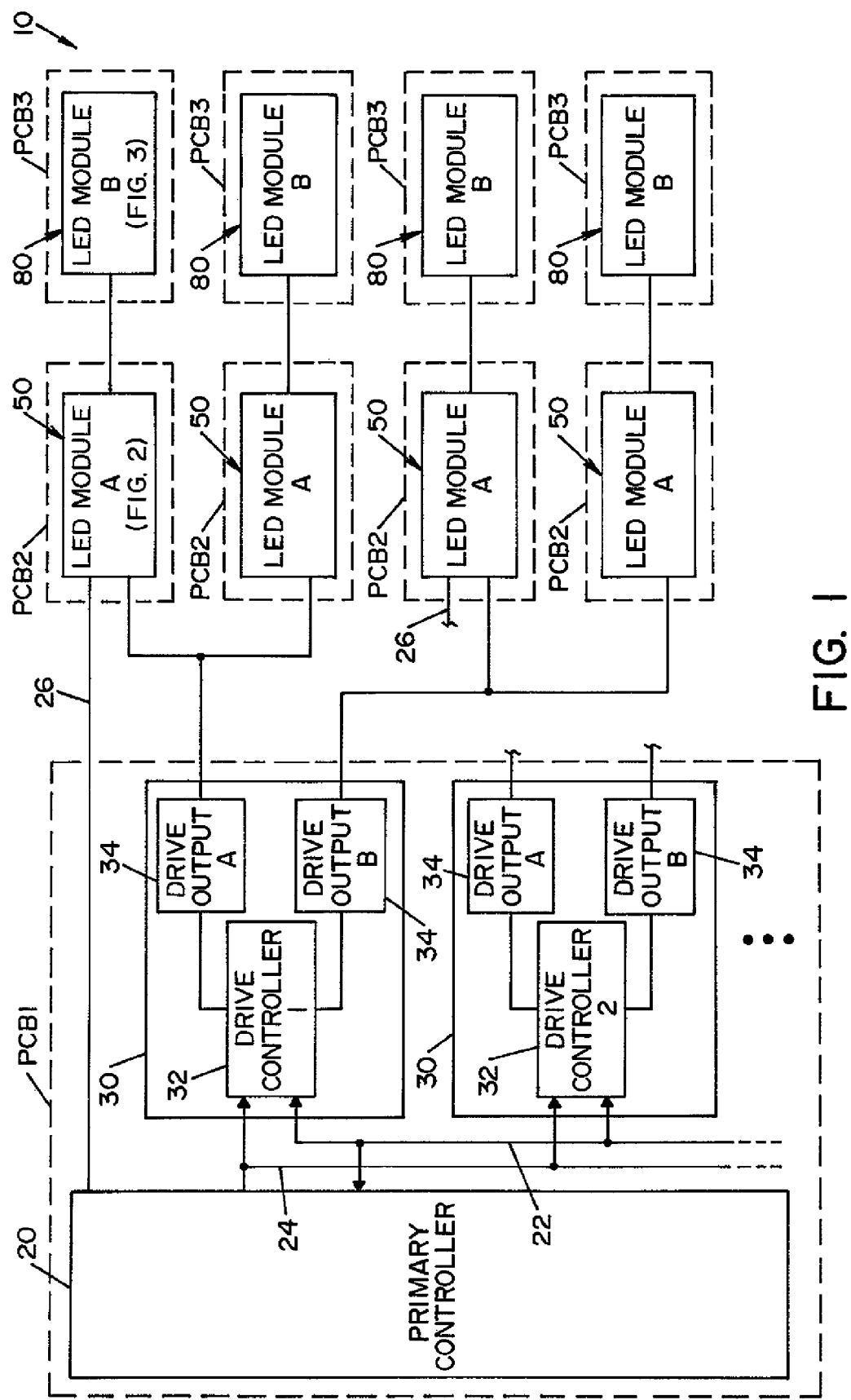
FIG. 1 is a general block diagram of a lighting control system for a lighting device, in accordance with an embodiment of the present invention.

Referring now to the drawings wherein the showings are for the purposes of illustrating an embodiment of the invention only and not for the purposes of limiting same, FIG. 1 shows a block diagram of lighting control system 10 for a lighting device, such as a surgical lighthead, in accordance with an embodiment of the present invention. Lighting control system 10 is generally comprised of a primary controller 20, drive circuitry 30 comprised of at least one drive controller 32 and at least one drive output 34, one or more first LED modules 50 (module A), and one or more second LED modules 80 (module B). In the illustrated embodiment, primary controller 20 and drive circuitry 30 are located on a first printed circuit board PCB1. Each of the first and second LED modules 50 and 80 are respectively located on second and third printed circuit boards PCB2 and PCB3. Printed circuit boards PCB1, PCB2 and PCB3 may be located together within a housing (not shown) for the lighting device. It should be appreciated that in an alternative embodiment, the components of LED modules 50 and 80 residing separately on printed circuit boards PCB2 and PCB3 may be located together on a single substrate (i.e., printed circuit board).

In the illustrated embodiment, primary controller 20 is a microcontroller. For example, primary controller 20 may take the form of an ARM-based processor with a variety of on-chip peripherals, including, but not limited to, an internal FLASH memory for program storage, a RAM memory for data storage, UARTs, timer/counters, a bus interface, a serial interface, an SPI interface, a programmable watchdog timer, programmable I/O lines, an A/D converter and PWM outputs. Primary controller 20 sends commands to drive controllers 32 and reads status information from each drive controller 32.

It should be understood that primary controller 20 may also communicate with other electronic devices not illustrated in FIG. 1, including, but not limited to, a user interface (e.g., front panel display with keypad, control switches or buttons), a communications interface, a video input connector, and a camera module. The user interface allows a user to turn ON/OFF the lighting device and select an intensity level for the lighting device. It can also allow the user to turn ON/OFF other accessories configured with the lighting system.

Primary controller 20 communicates with drive controllers 32 via a bus 22. In the illustrated embodiment, bus 22 is a serial bus (e.g., I²C). Primary controller 20 also provides a constant clock signal to drive controllers 32 via a synch line 24, as will be explained in further detail below.

In the illustrated embodiment, drive controller 32 is a microcontroller. For example, each drive controller 32 may take the form of an ARM microcontroller with a variety of on-chip peripherals, including, but not limited to, an internal FLASH memory for program storage, a RAM memory for data storage, timer/counters, a serial interface, an A/D converter, a programmable watchdog timer, and programmable I/O lines. In the illustrated embodiment, each drive controller 32 has a unique identification number that allows primary controller 20 to individually address each drive controller 32.

Figure 2:
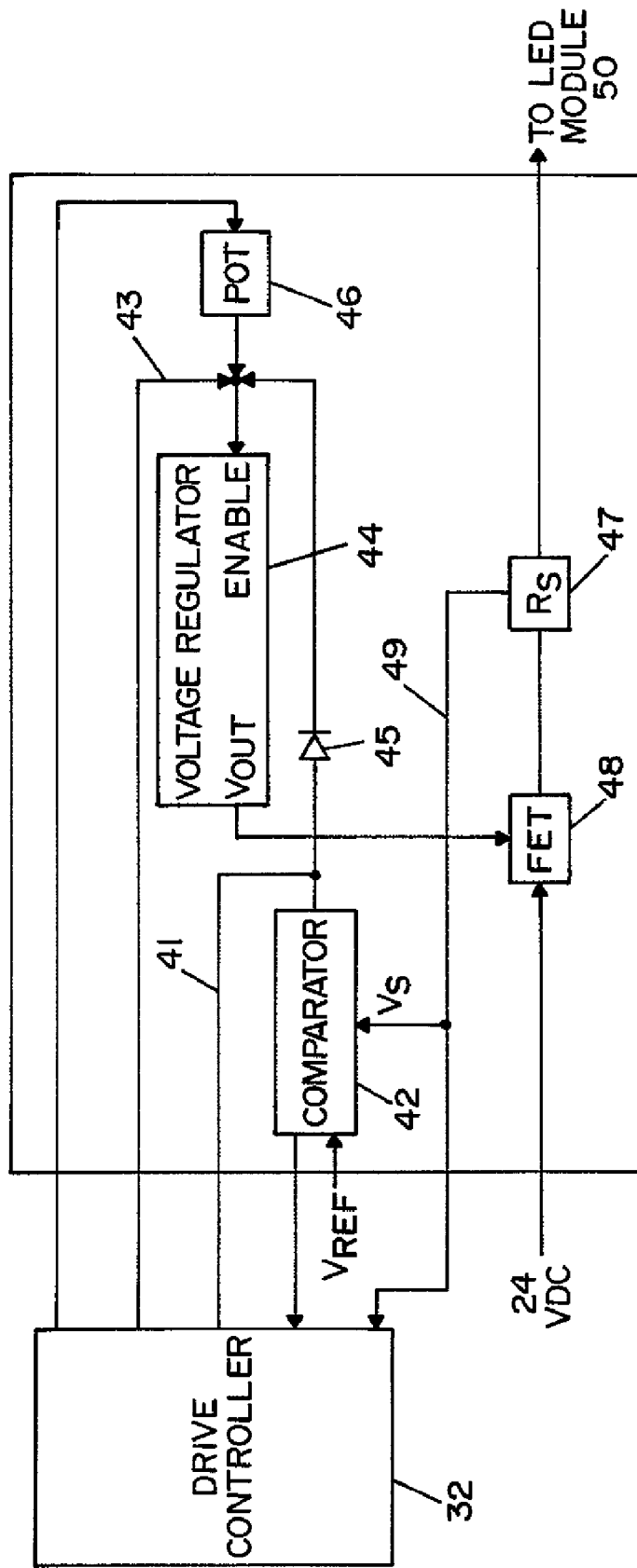
FIG. 2 is a schematic view of a drive output circuit, in accordance with an embodiment of the present invention.

Referring now to FIG. 2, each drive output 34 is a circuit generally comprising a comparator 42 (e.g., LMV7235 from National Semiconductor), a voltage regulator, a diode 45, a setpoint potentiometer (POT) 46, a power field effect transistor (FET) 48, and a feedback resistor ($R_S$) 47. Drive outputs 34 are driven (i.e., enabled) at a fixed frequency (i.e., fixed frequency enable signal provided via line 43). In the illustrated embodiment, drive outputs 34 are driven with an enable signal having a fixed frequency of 300 Hz.

Voltage regulator 44 provides an accurate fixed output voltage (e.g., 5V) when enabled. The output voltage (Vout) of voltage regulator 44 is electrically connected with power FET 48. FET 48 is used to handle the current required by LED modules 50, 80. Sense resistor ($R_S$) 47 provides current sensing. Setpoint POT 46 is used to adjust the output voltage of voltage regulator 44 until the sensed current associated with $R_S$ 47 is within a target current range.

Comparator 42 monitors the output voltage of a drive output 34. In this respect, comparator 42 receives a reference voltage ($V_{REF}$) as a first input and receives a sensed voltage ($V_S$) as a second input via line 49. Comparator 42 compares $V_{REF}$ to $V_S$ to determine whether the sensed current (Is) associated with $V_S$ exceeds a threshold current (e.g., approximately 1.26 A). If the threshold current has been exceeded, then comparator 42 outputs a signal to disable voltage regulator 44, thereby turning off $V_{OUT}$ of voltage regulator 44. Drive controller 32 may also disable voltage regulator 44 under certain conditions (e.g., detection of an open or short circuit fault).

Figure 3:
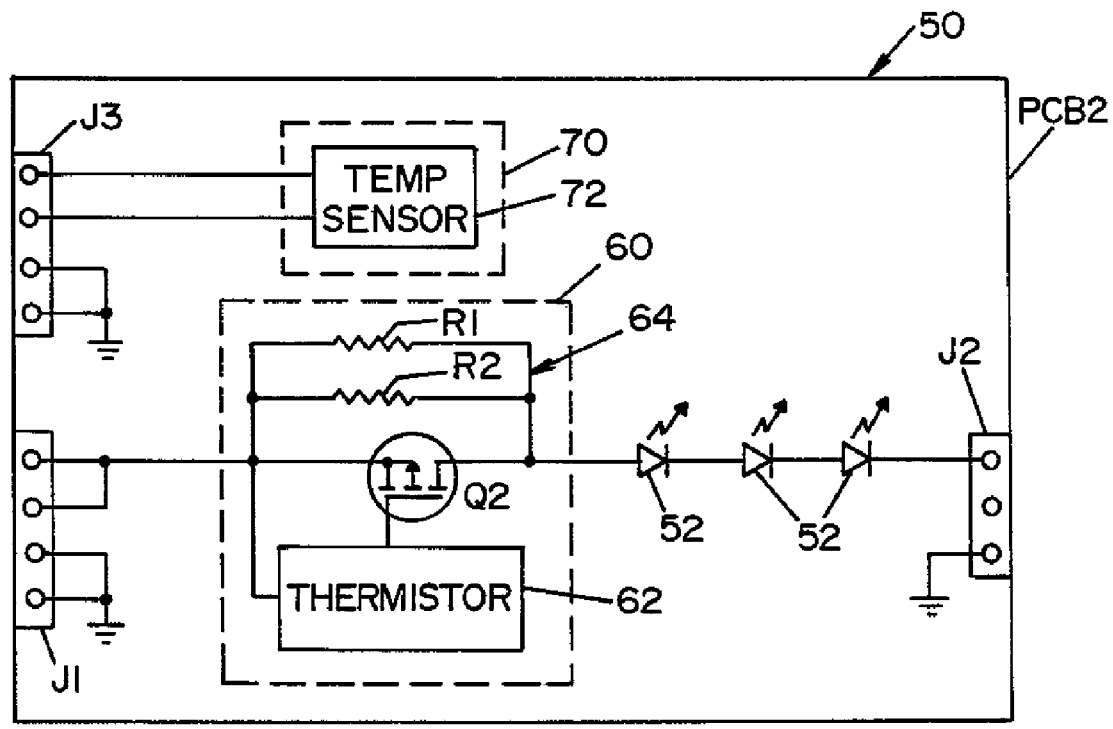
FIG. 3 is a schematic view of a first LED module including a temperature compensation circuit, in accordance with an embodiment of the present invention.
Figure 4:
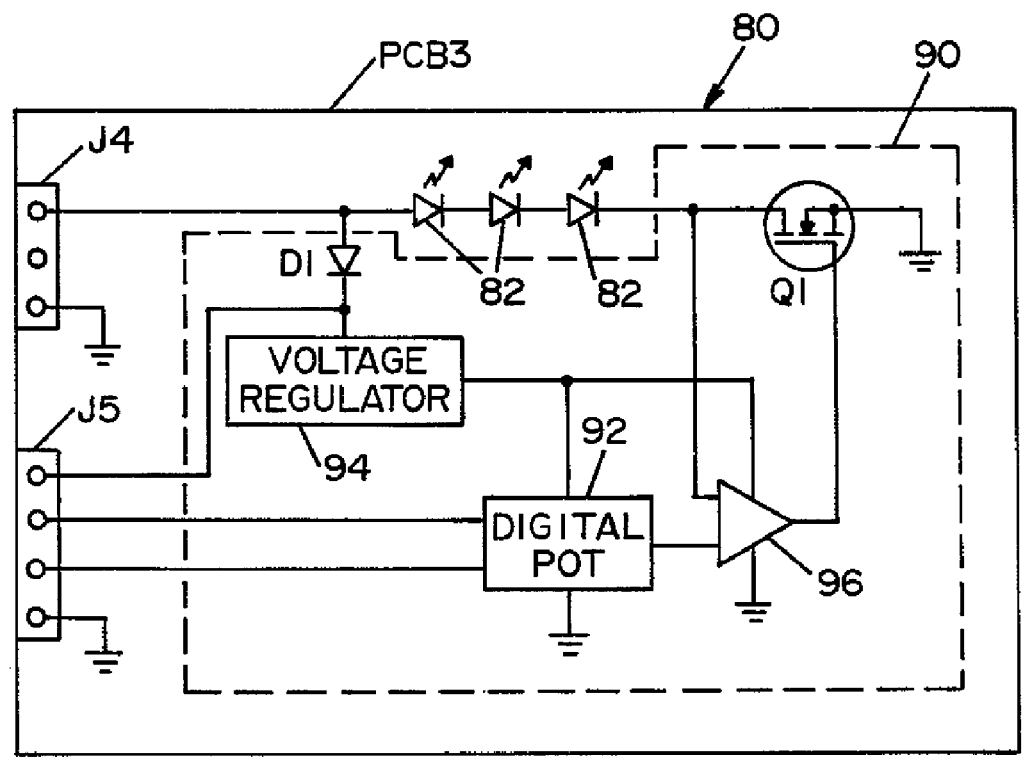
FIG. 4 is a schematic view of a second LED module including a trimming circuit, in accordance with an embodiment of the present invention.

FIGS. 3 and 4 respectively show schematic views of LED module 50 (module A) and LED module 80 (module B). LED modules 50, 80 are LED light sources. In the illustrated embodiment, LED modules 50 and 80 are electrically connected in series by a wire harness assembly connected between connector J2 of LED module 50 and connector J4 of LED module 80. Accordingly, each pair of series-connected LED modules 50, 80 collectively provide a set of six (6) series-connected LEDs. A first series-connected pair of LED modules 50, 80 may be wired in parallel with a second series-connected pair of LED modules 50, 80. The first and second series-connected pairs of LED modules 50, 80 are driven from a single drive output 34 (i.e., drive output channel). Each LED module 50 is electrically connected with a drive output 34 via a wire harness assembly (not shown) connected at connector J1. In the illustrated embodiment, two pair of LED modules 50, 80 are electrically connected with drive output A and two pair of LED modules 50, 80 are electrically connected with drive output B.

Referring now to FIG. 3, LED module 50 includes a plurality of LEDs 52, a temperature compensation circuit 60 and an optional remote temperature sensor circuit 70. In the illustrated embodiment, LED module 50 includes three (3) series-connected LEDs 52 (e.g., high brightness LEDs). Temperature compensation circuit 60 compensates for changes in the forward voltage required to drive LEDs due to increased temperatures. As LED temperatures increase, the forward voltage must be reduced in order to maintain constant drive current to the LEDs. Temperature compensation circuit 60 includes a field effect transistor (FET) Q2, a thermistor 62, and a resistor network 64 comprised of resistors R1 and R2. Power is provided to temperature compensation circuit 60 via connector J1. Thermistor 62 is a temperature sensing resistive device. FET Q2 balances (i.e., equalizes) resistor network 64 by turning on more (or less) to throttle the current.

Remote temperature sensor circuit 70 includes a temperature sensor 72 (e.g., TMP35 low voltage temperature sensor from Analog Devices) to provide primary controller 20 with temperature data for monitoring the temperature in the vicinity of printed circuit board PCB2. Temperature sensor 72 provides a voltage output that is linearly proportional to the sensed temperature. Temperature sensor circuit 70 is electrically connected to primary controller 20 via connector J3 and line 26. Primary controller 20 receives the output of temperature sensor circuit 70. Primary controller 20 may read a limited number of temperature sensor inputs from printed circuit boards PCB2. In the illustrated embodiment, only two temperature sensor circuits 70 on LED modules 50 are selected or connected to primary controller 20.

Referring now to FIG. 4, LED module 80 includes a plurality of LEDs 82 and a trimming circuit 90. In the illustrated embodiment, LED module 80 includes three (3) series-connected LEDs 82 (e.g., high brightness LEDs).

Trimming circuit 90 compensates for differences in forward voltage values between LEDs due to non-uniformity in the manufacture of LEDs. In this respect, trimming circuit 90 balances the voltage drop differences across the series-connected LEDs 52, 82 to insure that the appropriate voltage is applied across the series-connected LEDs 52, 82 to set the desired forward current value and make all LED modules 50, 80 appear identical (i.e., uniform lighting). Trimming circuit 90 includes an adjustable FET Q1 controlled by an amplifier (comparator) 96 (e.g., AD8220 JFET input instrumentation amplifier from Analog Devices) that provides a means whereby the paired LED modules 50, 80 can be calibrated (i.e., "trimmed") to a fixed voltage drop across the module pair as described below. A digital potentiometer (POT) 92 (e.g., MAX 5417 a digital potentiometer from Maxim Integrated Products) is used to fix the gate voltage to FET Q1. A micro-power voltage regulator 94 (e.g., LM4040 voltage reference from Maxim Integrated Products) is used to power amplifier 96 and digital POT 92. Voltage regulator 94 provides 5V for digital POT 92, amplifier 96 and bias circuits (not shown). The input to voltage regulator 94 uses a blocking diode D1 and two capacitors (not shown). The combination of diode D1 and the two capacitors provides a small capacitive storage between pulses to maintain constant voltage under the minimum duty cycle at the normal operating frequency (e.g., 25% at 300 Hz). Voltage regulator 94 is always powered once voltage is applied to LEDs 52, 82.

Operation of lighting control system 10 will now be described in detail. Primary controller 20 is programmed to provide overall control of lighting control system 10. In this respect, primary controller 20 communicates with drive controllers 32, as well as other system components, such as a user interface, and a video camera.

In the illustrated embodiment, primary controller 20 outputs a 30 KHz clock signal comprised of fixed-duration clock pulses. The clock signal is supplied to each drive controller 32 via synch line 24. The clock signal is used to maintain synchronization among drive controllers 32 and provide each drive controller 32 with a fixed time base used to drive respective LED modules 50, 80. In this regard, the clock signal directly drives two internal timers within each drive controller 32. The first internal timer of each drive controller 32 is associated with a first drive output 34 (drive output A) and the second internal timer of each drive controller 32 is associated with a second drive output 34 (drive output B). The internal timers allow the two drive outputs 34 (i.e., drive output A and drive output B) to provide drive output signals that are out of phase with each other, thereby preventing large fluctuations in current consumption when the lighting device is activated. In accordance with a preferred embodiment of the present invention, the phase is different for each drive output 34 of all drive controllers 32. Thus, drive output A of drive controller 1, drive output B of drive controller 1, drive output A of drive controller 2 and drive output B of drive controller 2 all provide drive output signals that are out of phase with each other.

The drive output signals associated with drive outputs 34 preferably have a fixed frequency of 300 Hz. The 300 Hz frequency is selected since it is a multiple of 50 Hz (the scan rate of PAL video cameras) and 60 Hz (the scan rate of NTSC video cameras). When using an optional video camera with the lighting device associated with the present invention, the camera will detect a noticeable flicker in the light if the output frequency of LEDs 52, 82 is not a multiple of the camera scan rate.

Primary controller 20 sends multiple commands to each drive controller 32 in order to "activate" LED modules 50, 80 (i.e., turn on LEDs 52, 82). The commands include a command indicative of a selected operating duty cycle (also referred to as a "target duty cycle") for the drive output signals of drive outputs 34, a command indicative of the "phase offset" for each drive output 34, and a command indicative of activation of LED modules 50, 80, referred to as a "start" command. The operating duty cycle is indicated by a number of pulses of the clock signal output by primary controller 20. As will be explained in further detail below, the number of pulses of the clock signal of primary controller 20 will establish the "ON time" for each period of the drive output signal produced by drive outputs 34.

The operating duty cycle is the ratio of the ON time of the drive output signal to the period of the drive output signal for drive outputs 34. As indicated above, each drive output signal preferably has a fixed frequency of 300 Hz, and thus has a period of 3.33 msec. In the illustrated embodiment, LED modules 50, 80 are turned ON (i.e., illuminated) during the ON time of the drive output signals. The internal timers of each drive controller 32 counts a predetermined number of pulses of the clock signal provided by primary controller 20 to establish the ON time for each period of the drive output signals. Accordingly, the predetermined number of counted pulses corresponds with the selected operating duty cycle for the drive output signals. For example, at a selected operating duty cycle of 40%, 40 pulses of the clock signal are counted to establish the ON time for the period of the drive output signals.

In addition, a phase offset is generated in units of the clock signal output by primary controller 20. The start command indicates to drive controllers 32 that the associated LED modules 50, 80 are about to be activated (i.e., turn on LED lights). Drive controllers 32 use the start command to initialize their respective internal timers and prepare for commencement of the clock signal generated by primary controller 20. Primary controller 20 may also send a "stop" command to drive controllers 32 in order to inform drive controllers 32 to turn off associated drive outputs 34 and stop their respective internal timers.

As discussed above, the clock signal of primary controller 20 drives the two internal timers within each drive controller 32, thereby allowing drive controllers 32 to control associated LED modules 50, 80 at the operating duty cycle, via drive output signals of drive outputs 34. The values for various operating duty cycles provided by primary controller 20 are established to correspond to a plurality of predetermined, user selectable LED intensity levels. The duty cycle values associated with each intensity level may be pre-stored in a lookup table in the memory of primary controller 20. By way of example, and not limitation, the illustrated embodiment may include the nine fixed intensity levels shown in TABLE 1:

TABLE 1

| Intensity Level | Duty Cycle |
|---|---|
| 1 | 40% |
| 2 | 50% |
| 3 | 60% |
| 4 | 70% |
| 5 | 80% |
| 6 | 90% |

TABLE 1-continued

| Intensity Level | Duty Cycle |
|---|---|
| 7 | 100% |
| Maintenance | 25% |
| Calibration | 100% |

The duty cycle value for the maintenance intensity level provides a low duty cycle in order to obtain low light intensity to facilitate inspection for failed LED modules 50, 80 with reduced eye discomfort. The duty cycle value for the calibration intensity level provides a maximum duty cycle that allows convenient adjustment of power supplies until the lowest drive current output is at the target drive current, thereby delivering sufficient drive output current to all of the LED modules 50, 80.

As will be described in greater detail below, primary controller 20 is also programmed to operate LED modules 50, 80 during a warm-up mode such that the light output provided by LED modules 50, 80 does not exceed a predetermined maximum light output level and a substantially uniform light output is maintained.

Operation of LED module 50 (module A) will now be described in detail with reference to FIG. 3. Temperature compensation circuit 60 adjusts the total voltage drop across the LED module pairs 50, 80, as the forward voltage characteristics of LEDs 52, 82 changes with LED temperature. As LEDs 52, 82 heat up, their forward voltage drops. Reductions in forward voltage leads to an increase of current flowing through LEDs 52, 82. The total voltage drop across the six series-connected LEDs 52, 82 of LED modules 50, 80, is high enough to require some form of temperature compensation to maintain the LED drive current at the target drive current and to prevent the LED modules 50, 80 from going into over-current shutdown.

Temperature compensation circuit 60 of LED module 50 (i.e., LED module A) includes a FET Q2 that is biased such that when LED modules 50, 80 are cold, FET Q2 is fully on. This results in the forward resistance of FET Q2 being very low so there is a relatively small amount of voltage dropped across FET Q2 when cold. As LED modules 50, 80 begin to heat up, thermistor 62 acts to reduce the gate voltage on FET Q2 and increases its forward resistance. This action effectively absorbs the reduction of forward voltage as LEDs 52, 82 heats up. As the LEDs 52, 82, begins to heat up, thermistor 62 in the FET Q2 bias network acts to reduce the gate voltage on the FET Q2 and increases its forward resistance. This action effectively absorbs the reduction of forward voltage as LEDs 52, 82 heat up. As the resistance of thermistor 62 gets increasingly lower, the gate voltage to the FET Q2 gets low enough so that the resistance of FET Q2 is much higher than that of the pair of parallel low value power resistors R1, R2. At this point, virtually all of the current flowing through the temperature compensation circuit 60 passes through parallel resistors, R1, R2, effectively switching out FET Q2. Switching out FET Q2 and switching in fixed resistors, R1, R2, allows FET Q2 to be smaller and less expensive since FET Q2 does not need to be rated to handle the total current at higher temperatures. Temperature compensation circuit 60 is a stand alone circuit that has no feedback to drive controller 32 or primary controller 20.

As indicated above, temperature sensor circuit 70 provides data to primary controller 20 for display only and is indicative of the operating temperature in the vicinity of LED module 50.

Operation of LED module 80 (module B) will now be described in detail with reference to FIG. 4. Trimming circuit 90 of LED module 80 provides the ability of inserting an adjustable fixed voltage drop in series with the six LEDs, 52, 82 to calibrate the pair of LED modules 50, 80 to a fixed input voltage used to power all LED modules 50, 80 in the lighting device. An adjustable voltage drop in series with LEDs, 52, 82, allows the voltage of each pair of modules 50, 80, to be set to a common voltage at a specified current. This capability allows pairs of modules 50, 80 to be driven in parallel.

Each drive output 34 drives two pairs of LED modules 50, 80 electrically connected in parallel. If the two parallel pairs of LED modules 50, 80 do not have substantially similar forward voltage drops, the currents through the two parallel pairs of LED modules 50, 80 will not be equal, and thus the light output of the two parallel pairs of LED modules 50, 80 will vary accordingly.

Amplifier 96 of trimming circuit 90 generates the gate voltage of FET Q1 based on the difference between the positive input from the FET drain and the negative input that is set using digital POT 92. When digital POT 92 is being set to an appropriate resistance value, FET Q1 acts as a fixed resistor in series with LEDs 52, 82. Adjusting the forward resistance of FET Q1 effectively nullifies forward voltage variations of LED modules 50, 80 caused by the different forward voltages of LEDs 52, 82.

POT 92 is adjusted and programmed as part of the LED module manufacturing process by connecting connector J5 to a programming tool (e.g., a test and calibration instrument) that writes a setpoint value to the POT 92. Adjustment of POT 92 is performed during a manufacturing and test process when the LED modules, 50, 80, are electrically connected together. During the manufacturing process of LED modules 50, 80, approximately 24V is applied by a test and calibration instrument to LED module 50 via connector J1. POT 92 is then adjusted such that the drive current through LEDs 52, 82 is a predetermined drive current target value. Trimming circuit 90 is a stand alone circuit and has no feedback to drive controller 32 or primary controller 20.

It should be noted that LED modules 50, 80 may be overdriven to account for optical losses during assembly of the lighting device. In this regard, the LED drive current control target is set to a predetermined, fixed offset above the nominal LED forward drive current. Accordingly, manufacturing personnel will be able to increase the intensity of LEDs 52, 82 by adjusting the drive current to a value within the allowable LED manufacturer range, thereby achieving a desired lux reading from the lighting device.

A calibration function is provided by primary controller 20 to allow an additional adjustment to be made to "tune" the drive current closer to the target drive current. Power supplies with adjustable 24VDC output to be supplied to lightheads that include LED modules 50, 80 may have the outputs adjusted up or down to increase or reduce the drive current readings.

Drive controller 32 is programmed to sample the LED drive current, and determine whether the LED drive current is within the target drive current value plus/minus a predefined tolerance to provide fault messages to the display. If the LED drive current is outside the allowable tolerance, an audible or visual alarm indicator may be used to indicate to the user that power supplies need to be adjusted, or LED modules 50, 80 (or associated harnesses) need replacement.

Primary controller 20 is programmed to monitor the LED drive current of drive outputs 34 to determine if one or both of the associated pair of LED modules 50, 80 have failed "opened" (i.e., open circuit) in order to supply a fault message to the display. If one LED module 50, 80 of the LED module pair has failed open, the drive current will be approximately 50% of a target drive current setting. If both LED module pairs have failed, the drive current reading will be approximately 0 mA. The failed conditions are detected by primary controller 20 and indicator alarms are generated at user interfaces. A portion of each drive output 34 determines whether an LED module 50, 80 has failed due to a short circuit. In this respect, drive output 34 detects the presence of a short circuit and generates an over-current indication to the associated drive controller 32. This drive controller 32 then turns off the drive output 34 associated with the LED module 50, 80 having a short circuit, and prevents the drive output 34 from being turned on until the short circuit fault condition has been cleared. A fault message may be also displayed to a user.

Figure 5A:
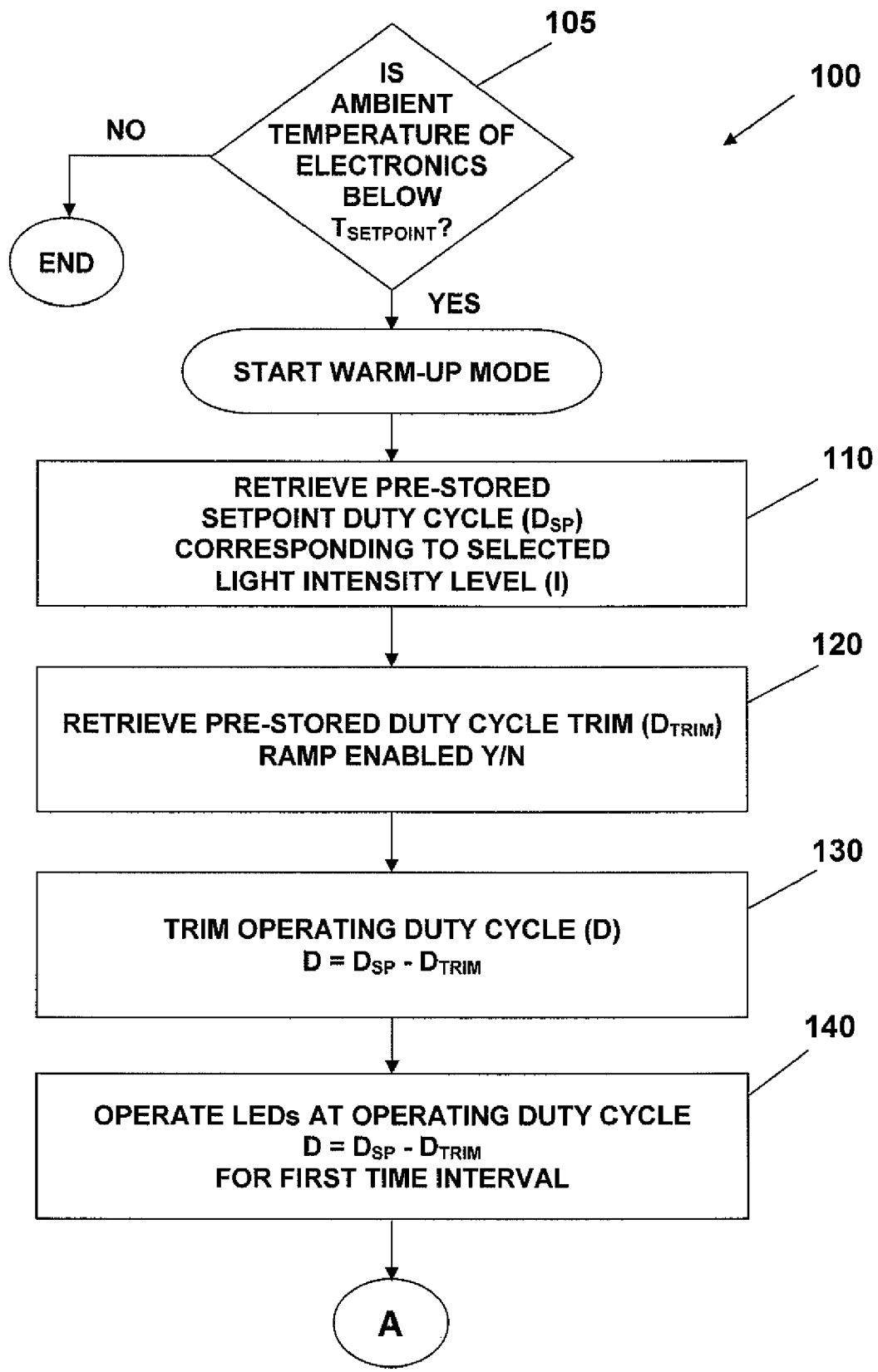
FIGS. 5A and 5B show a flow diagram illustrating a lighting control method for a warm-up period, in accordance with an embodiment of the present invention.
Figure 5B:
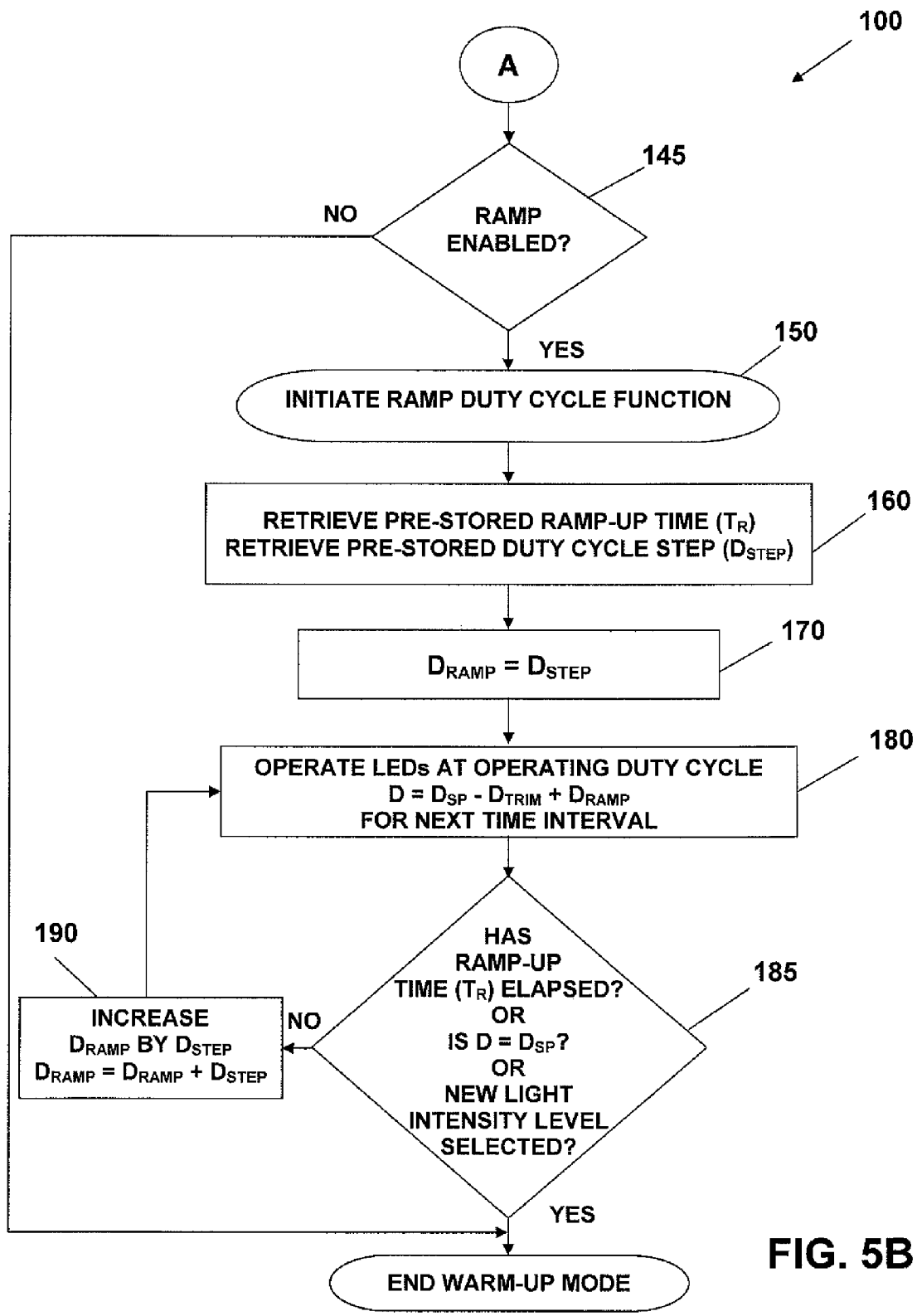

As discussed above, primary controller 20 is programmed to operate in accordance with a warm-up mode, as will be explained in detail with reference to FIGS. 5A and 5B. FIGS. 5A and 5B provide a flow diagram of a lighting control method for operating LEDs during a warm-up mode. The warm-up mode is initiated when the LED modules 50, 80 are initially turned ON at startup, provided that the ambient temperature of the electronics for the LED light source is below a predetermined setpoint temperature ($T_{SETPOINT}$) e.g., 38° C. The ambient temperature is checked at step 105. Primary controller 20 retrieves the pre-stored setpoint duty cycle ($D_{SP}$) corresponding to a user selected light intensity level (Step 110). For example, intensity levels 1-7, may respectively correspond to setpoint duty cycles ($D_{SP}$) of 40%, 50%, 60%, 70%, 80%, 90% and 100%. Thereafter, primary controller 20 retrieves a pre-stored duty cycle trim value ($D_{TRIM}$) associated with the selected light intensity level (Step 120). Primary controller 20 is also programmed to determine if a ramp duty cycle function has been enabled (Step 120). The ramp duty cycle function is described in detail below.

At Step 130, the operating duty cycle (D) is established at the setpoint duty cycle ($D_{SP}$), corresponding to the selected intensity level, as trimmed by $D_{TRIM}$. Thus, during a first time interval (e.g., 15 minutes), LED modules 50, 80 are operated at an operating duty cycle (D) equal to the setpoint duty cycle ($D_{SP}$) reduced by $D_{TRIM}$ (Step 140). As discussed above, the operating duty cycle (D) refers to the duty cycle of the drive output signals of drive outputs 34. After the first time interval has elapsed, primary controller 20 determines whether the ramp duty cycle function has been enabled (Step 145). If the ramp duty cycle function has not been enabled, then the warm-up mode is ended. Alternatively, if the ramp duty cycle has been enabled, then the ramp duty cycle function is initiated (Step 150).

At Step 160, primary controller 20 retrieves pre-stored values for ramp-up time ($T_R$) and duty cycle step value ($D_{STEP}$). The duty cycle step value ($D_{STEP}$) is a percentage value (e.g., 2%). The duty cycle ramp value ($D_{RAMP}$) is initially set equal to $D_{STEP}$ (Step 170). At Step 180, LED modules 50, 80 are operated during a time interval (e.g., 5 minutes) at an operating duty cycle (D) set equal to $D_{SP}-D_{TRIM}+D_{RAMP}$. At the end of the time interval, primary controller 20 determines whether the ramp-up time ($T_R$) has elapsed, whether the operating duty cycle (D) has reached the setpoint duty cycle $D_{SP}$ for the selected light intensity level or whether a new light intensity level has been manually selected by the user, thereby resulting in a new operating duty cycle (Step 185). If any one of these conditions has been met, then the warm-up mode is ended. If none of these conditions have been met, then primary controller 20 increases the current $D_{RAMP}$ by $D_{STEP}$ (Step 190). Primary controller 20 then operates LED modules 50, 80 for the subsequent time interval at the newly established operating duty cycle (D), which is equal to $D_{SP}-D_{TRIM}+D_{RAMP}$ (Step 180). Since $D_{RAMP}$ has been increased at Step 190, the operating duty cycle (D) will be increased at Step 180. This gradual stepped increase in the operating duty cycle (D) will continue for subsequent time intervals, until one of the conditions at step 185 is met, thereby ending the warm-up mode.

Other modifications and alterations will occur to others upon their reading and understanding of the specification. It should be understood that it is contemplated that the present invention may have many alternative configurations. For example, in one configuration, 28 LED modules are grouped into 14 LED module pairs. Accordingly, four drive controllers are connected with the primary controller. In another configuration, 56 LED modules are grouped into 28 LED module pairs. Accordingly, seven drive controllers are connected with the primary controller. Furthermore, it is contemplated that multiple color LEDs may be substituted for the single color LEDs of the illustrated embodiment. It is intended that all such modifications and alterations be included insofar as they come within the scope of the invention as claimed or the equivalents thereof.

Having described the invention, the following is claimed:

1. A lighting control method for controlling an LED light source during an LED warm-up mode, the method comprising:
   (a) retrieving a pre-stored setpoint duty cycle corresponding to a light intensity level;
   (b) operating the LED light source during a first time interval at an operating duty cycle equal to the setpoint duty cycle minus a pre-stored duty cycle trim value;
   (c) setting a duty cycle ramp value equal to a pre-stored duty cycle step value;
   (d) operating the LED light source for a time interval at an operating duty cycle equal to the setpoint duty cycle minus the duty cycle trim value plus the duty cycle ramp value; and
   determining whether (1) a ramp-up time has elapsed, (2) the operating duty cycle equals the setpoint duty cycle, or (3) a new light intensity level has been selected, and ending the LED warm-up mode if any one of (1), (2) or (3) has occurred, and if (1), (2) and (3) have not occurred, then increasing the duty cycle ramp value by the duty cycle step value, and returning to step (d).

2. A lighting control method according to claim 1, wherein after the first time interval has elapsed, determining whether a ramp duty cycle function has been enabled, wherein if the ramp duty cycle function has not been enabled, then ending the LED warm-up mode.

3. A lighting control method according to claim 1, wherein said warm-up mode is initiated only if ambient temperature of electronics for the LED light source is below a predetermined setpoint temperature.

4. A lighting control method for controlling an LED light source during an LED warm-up mode, the method comprising:
   (a) establishing a light intensity level;
   (b) retrieving a pre-stored setpoint duty cycle corresponding to the light intensity level;
   (c) retrieving a pre-stored duty cycle trim value;
   (d) operating the LED light source during a first time interval at an operating duty cycle equal to the setpoint duty cycle minus the duty cycle trim value;
   (e) retrieving a pre-stored ramp-up time;
   (f) retrieving a pre-stored duty cycle step value;
   (g) setting a duty cycle ramp value equal to the pre-stored duty cycle step value;

(h) operating the LED light source for a time interval at an operating duty cycle equal to the setpoint duty cycle minus the duty cycle trim value plus the duty cycle ramp value;

(i) determining whether a predetermined condition has been satisfied;

(j) if the predetermined condition has been satisfied, then increasing the duty cycle ramp value by the duty cycle step value and returning to step (h); and (k) if the predetermined condition has not been satisfied, then ending the warm-up-mode.

5. A lighting control method according to claim 4, wherein said predetermined condition is whether: (1) the ramp-up time has not elapsed, (2) the operating duty cycle does not equal the setpoint duty cycle, and (3) a new light intensity level has not been selected.

6. A lighting control method according to claim 4, wherein after the first time interval has elapsed, determining whether a ramp duty cycle function has been enabled, wherein if the ramp duty cycle function has not been enabled, then ending the LED warm-up mode.

7. A lighting control method according to claim 4, wherein said warm-up mode is initiated only if ambient temperature of electronics for the LED light source is below a predetermined setpoint temperature.

\* \* \* \* \*